(12) United States Patent
Campbell et al.

(10) Patent No.: US 8,080,965 B2
(45) Date of Patent: Dec. 20, 2011

(54) MOTOR CONTROLLER WITH DETERMINISTIC SYNCHRONOUS INTERRUPT HAVING MULTIPLE SERIAL INTERFACE BACKPLANE

(75) Inventors: Alan J. Campbell, New Berlin, WI (US); John Howard Stuedemann, Milwaukee, WI (US); John Michael Keller, Milwaukee, WI (US); Calvin C. Steinweg, Hartford, WI (US); Paul Thomas Krause, Fredonia, WI (US); Peter John Halpin, Mequon, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 468 days.

(21) Appl. No.: 12/272,604

(22) Filed: Nov. 17, 2008

(65) Prior Publication Data
US 2010/0123422 A1 May 20, 2010

(51) Int. Cl.
*G05B 19/02* (2006.01)
(52) U.S. Cl. .............. 318/600; 318/34; 318/43; 318/83; 318/439; 700/22; 701/305

(58) Field of Classification Search ............... 318/34, 318/43, 83, 600, 439; 700/22; 701/305
See application file for complete search history.

(56) References Cited

U.S. PATENT DOCUMENTS

| | | | |
|---|---|---|---|
| 2002/0049505 A1* | 4/2002 | Heinemann et al. | 700/22 |
| 2002/0148675 A1* | 10/2002 | Higashira et al. | 180/446 |
| 2009/0119437 A1* | 5/2009 | Hilscher | 710/305 |

* cited by examiner

*Primary Examiner* — Paul Ip
(74) *Attorney, Agent, or Firm* — Fletcher Yoder P.C.; Alexander R. Kuszewski; John M. Miller

(57) ABSTRACT

In one embodiment, a motor drive is provided that includes a control board and one or more option boards coupled to the control board via one or more serial interfaces such that data from the one or more option boards is communicated via one or more synchronous interrupts on the one or more serial interfaces. A method of operating a motor drive that includes transmitting one or more signals from an option board to a control board via one or more synchronous interrupts, wherein the option board is coupled to the control board via a serial interface. A tangible machine-readable medium implementing the method is also provided.

23 Claims, 14 Drawing Sheets

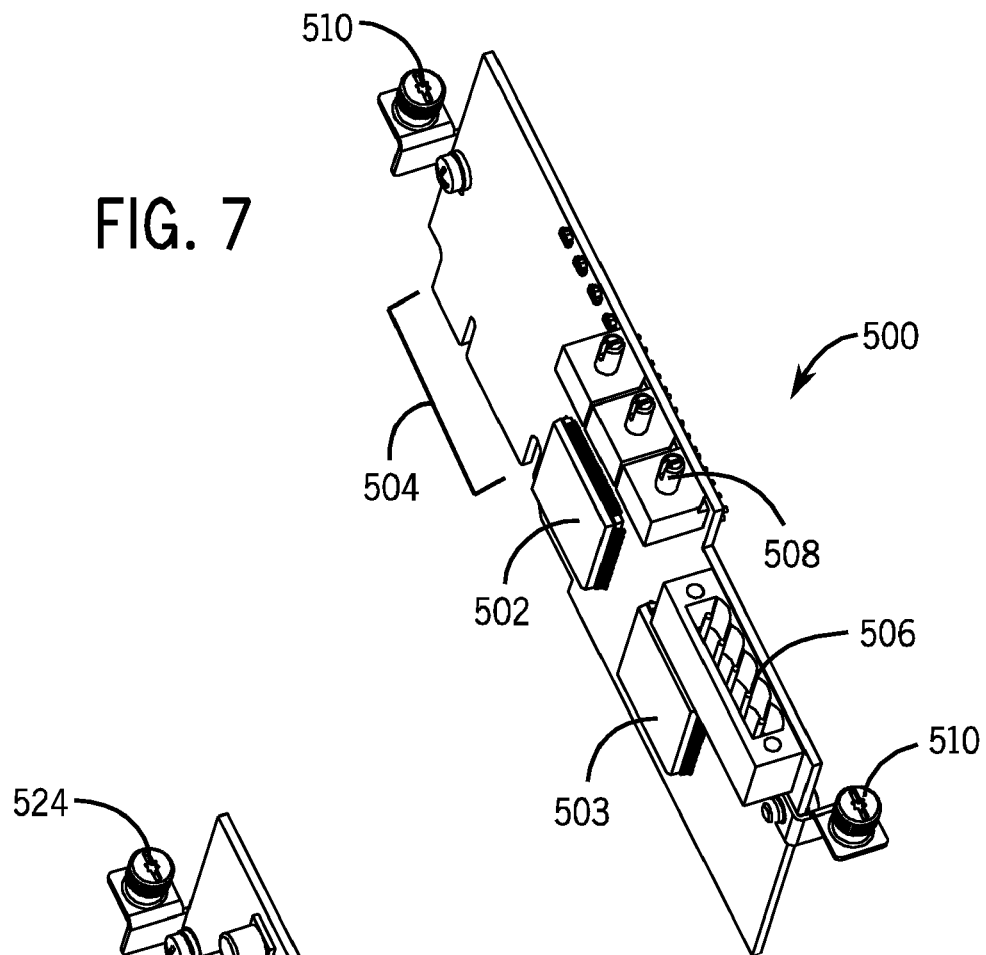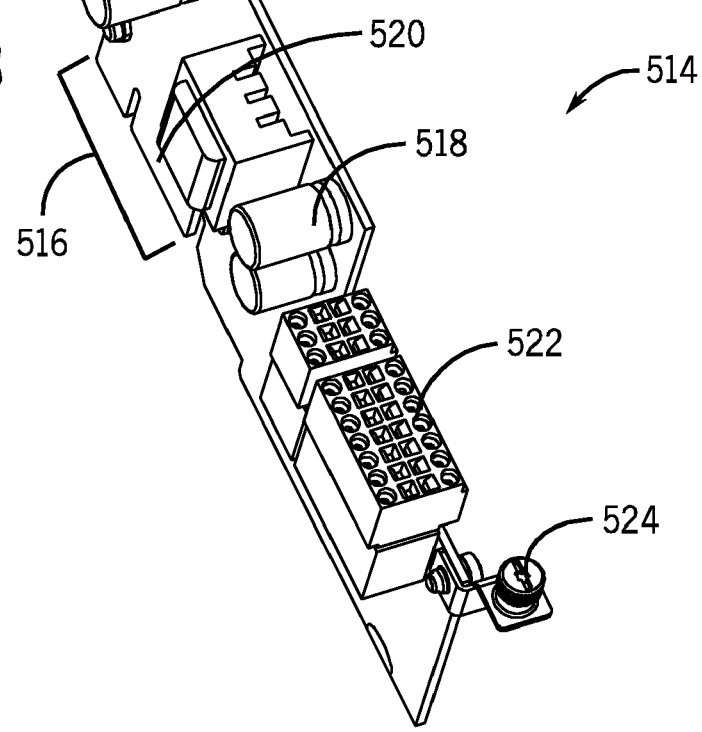

MOTOR CONTROLLER WITH DETERMINISTIC SYNCHRONOUS INTERRUPT HAVING MULTIPLE SERIAL INTERFACE BACKPLANE

BACKGROUND

The present invention relates generally to the field of power electronic devices, and particularly to a hardware architecture for motor control drives to provide interfaces for communication and control of motors and processes.

A wide variety of applications exist for power electronic devices, such as switching devices and systems. In such systems, multiple components may be combined and interconnected for a wide range of functionality. For example, in traditional switchgear applications, such as motor drives, an enclosure is generally provided into which power is routed, along with network signals, sensor inputs, actuator outputs, and so forth. Components within the enclosure are interconnected with external circuitry, and can be interconnected with one another to provide for control, monitoring, circuit protection, and a multitude of other functions. Such conventional approaches, however, require a substantial number of terminations of various conductors, routing of conductors, mounting of various components, and so forth.

In other types of packaging, components may be associated with one another in mounting areas or bays, which are electrically coupled to buses for routing power to the various components. Examples of this type of packaging may be found in conventional motor control drives, in which various control, monitoring and protective circuits are mounted and interconnected with one another via wiring harnesses, cables, and so forth. In other applications, particularly where power levels are much lower, it has become conventional to provide a "backplane" to which components may be coupled, such as via plug-in connections. Such backplanes are currently in use throughout industrial applications, as for providing data and control signals to and from programmable logic controllers, computer components and peripherals, and so forth. The use of such backplanes, through which data and control signals can be easily routed, presents substantial advantages from the point of view of ease of assembly, replacement, servicing and expansion of overall systems incorporating a large number of interfaced components.

However, for backplanes using multiple components receiving any number of signals, the routing and timing of such signals to the motor control drive may present hardware and software challenges. The signaling must operate in such a way so that each signal reaches the main processing unit of the motor control drive and may be processed quickly enough to ensure a timely response. Additionally, where synchronization of multiple motors is required, synchronization of the signals of multiple motors and sensors also presents additional challenges.

BRIEF DESCRIPTION

The present invention provides a novel approach to configuration and management of motor drives and synchronization of signals of such drives. The approach includes a motor drive having a control circuit or board and one or more functional circuits that may perform various optional functions, sometimes referred to as option boards physically connected to the control board via a backplane. The option boards may communicate with the control board via one ore more synchronous interrupts over dedicated serial bus interfaces. Each serial interface may include a first channel having a first interrupt and a second channel having a second interrupt.

Methods, devices, and computer programs are all supported for performing these and other functions of the invention.

DRAWINGS

These and other features, aspects, and advantages of the present invention will become better understood when the following detailed description is read with reference to the accompanying drawings in which like characters represent like parts throughout the drawings, wherein:

FIGS. 7-10 are perspective views of option boards configured to be used with the pod and backplane of FIGS. 5 and 6 in accordance with an embodiment of the present invention;

DETAILED DESCRIPTION

Figure 1:
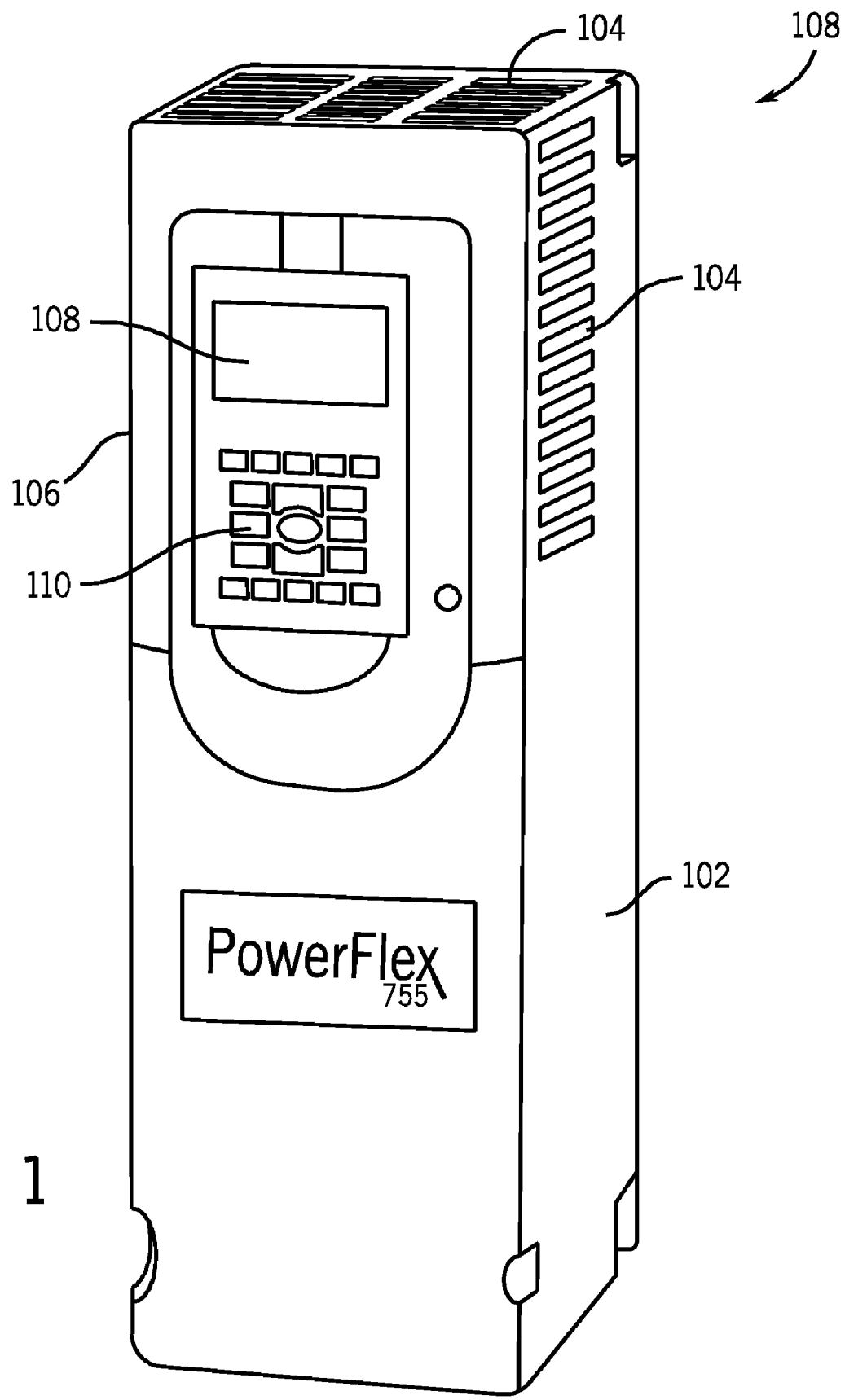
FIG. 1 is a perspective view of a motor drive in accordance with an embodiment of the present invention.

Beginning now with FIG. 1, a perspective view of a motor drive 100 is depicted. In one embodiment, the motor drive 100 may be a PowerFlex drive manufactured by Rockwell Automation of Milwaukee, Wis. The motor drive 100 may include a housing 102 having cooling vents 104 on one or more sides of the drive 100. To facilitate interacting with the motor drive 100, the motor drive 100 may include a human-machine interface (HMI) 106. The HMI 106 may include a display 108, such as an LCD or other display and a keypad 110 allowing input by a user. Additionally, the HMI 106 may be removable and dockable in a receptacle 114 in the housing 102.

As described further below, the motor drive is adapted to receive three-phase power from a power source, such as the electrical grid and to convert the fixed frequency input power to controlled frequency output power. The motor drive 100 may manage both application of electrical power to the loads, typically including various machines or motors. The drive may also collect data from the loads, or from various sensors associated with the load or the machine system of which the load is part. Such data may be used in monitoring and control functions, and may include parameters such as current, voltage, speed, rotational velocity, temperatures, pressures, and so forth. The motor drive 100 may be associated with a variety of components or devices (not shown) used in the operation and control of the loads. Exemplary devices contained within the motor drive 100 are motor starters, overload relays, circuit breakers, and solid-state motor control devices, such as variable frequency drives, programmable logic controllers, and so forth. As discussed further below, the motor drive 100 may include expandable functionality through the addition of option boards installed in a backplane inside the motor drive 100. Additionally, the motor drive 100 may be used in conjunction with other motor drives, such that a plurality of motor drives may be used to control one or more processes. As also discussed below, functions within the drive are synchronized, and the drive (and its internal functions) may be synchronized with other drives in an overall machine system.

Figure 2:
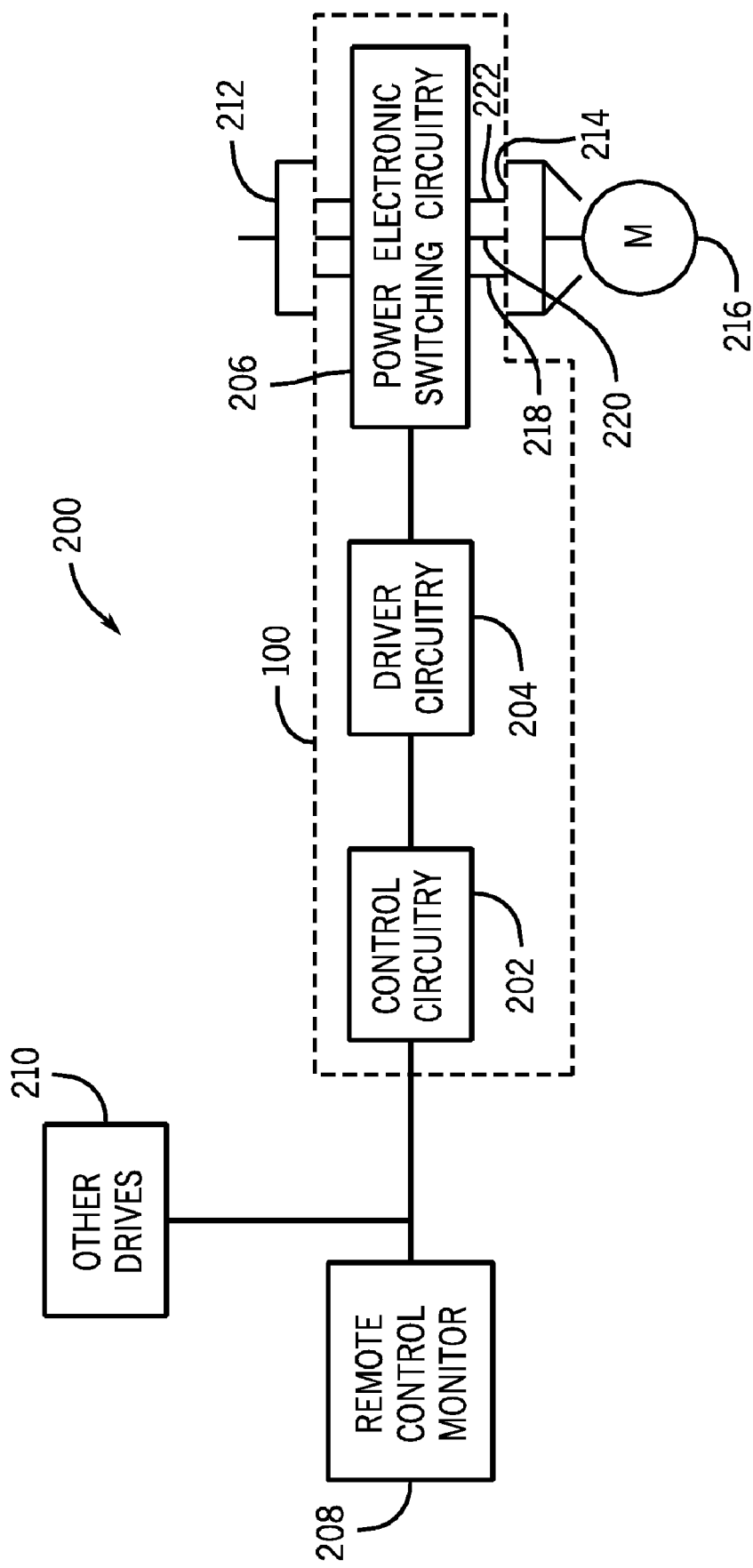
FIG. 2 is a block diagram of a motor drive system in accordance with an embodiment of the present invention.

FIG. 2 is a block diagram 200 illustrating various internal components of the drive 100 and other devices in the system 200. For example, the drive 100 may include control circuitry 202, driver circuitry 204, and power electronic switching circuitry 206. The power electronic switching circuitry 206 may receive three-phase power 212, and output three phase power 214 to a motor 216. To facilitate control of the motor drive 100, a remote control monitor 208 may be connected to the motor drive 100. Additionally, other drives 210 may also be connected to the motor drive 100 and the remote control monitor 208, such as via a network. Remote control and monitoring functions, and coordinated operation of the drive may be performed via such network connections. Moreover, such networks and network connections may be based on any known or subsequently developed standard, including standard industrial protocols, Ethernet protocols, Internet protocols, wireless protocols, and so forth.

The control circuitry 202 and driver circuitry 204 may include a control circuit board and various optional function circuits, referred to herein as "option boards", in accordance with an embodiment of the present invention, as discussed further below. The driver circuitry 204 signals the switches of the power electronic switching circuitry 206 to rapidly close and open, resulting in a three phase waveform output across the output terminals 218, 220, and 222. The driver circuitry 204 is controlled by the control circuitry 202, which may operate autonomously, or which may respond to command inputs from the remote control monitor 208 through a network. Similarly, operation of the driver circuitry may be coordinated, via the control circuitry, with that of other drives. Many different control schemes and functions may be implemented by the control circuitry, and programs for such operation may be stored on the control board, such as for closed loop speed control, closed loop torque control, among many others.

Figure 3:
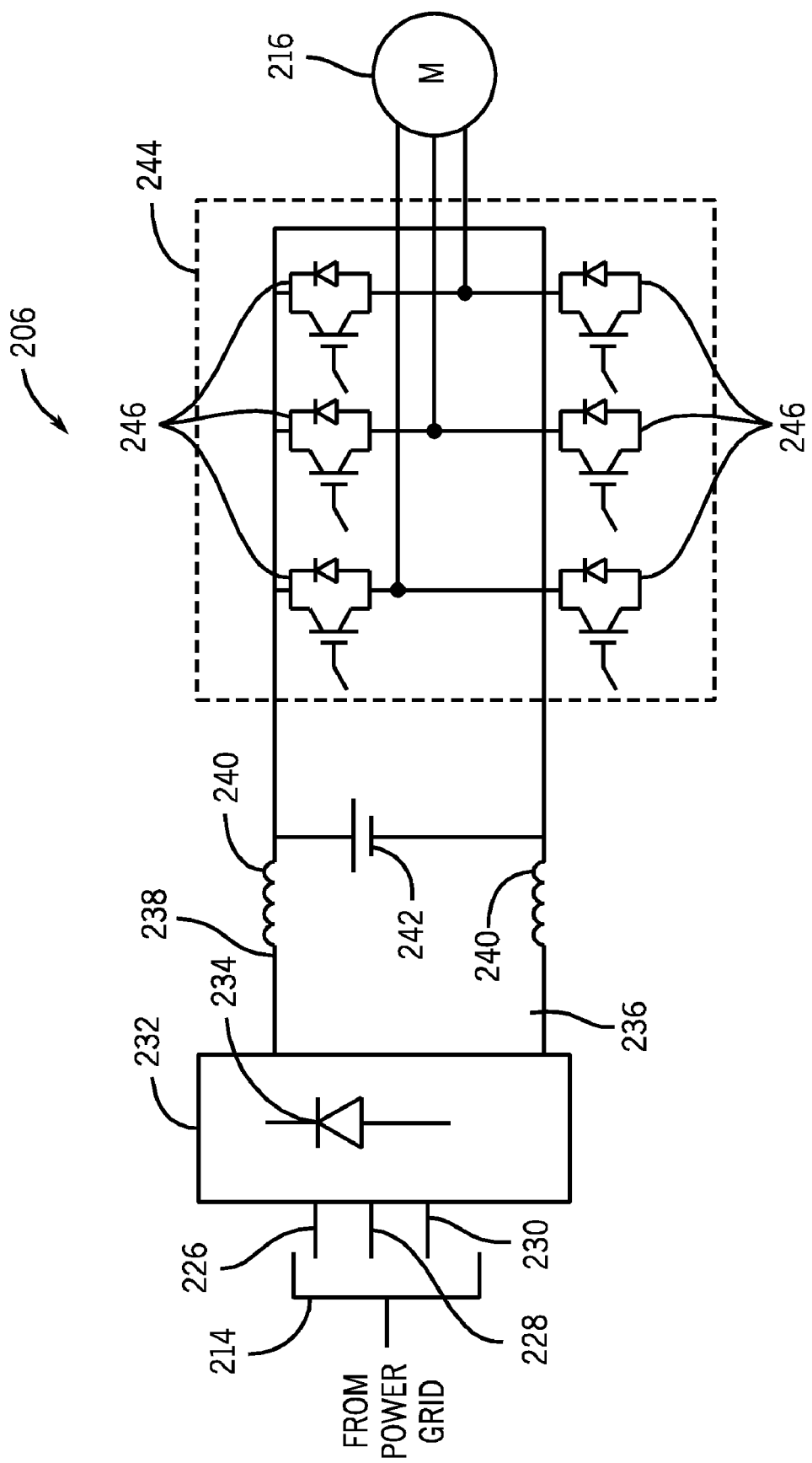
FIG. 3 is a schematic diagram of the power electronic switching circuitry of FIG. 2 in accordance with an embodiment of the present invention.

FIG. 3 is a schematic diagram of power electronic switching circuitry 206. As mentioned above, the power electronic switching circuitry will typically receive as an input three phase power 214, such as from the power grid. The three phase power source is electrically coupled to a set of input terminals 226, 228, and 230 that provide three phase AC power of constant frequency to rectifier circuitry 232. The rectifier circuitry 232 includes components, such as diodes 234 that perform full wave rectification of the three phase voltage waveform. After rectification, all phases of the incoming power are combined to provide DC power to the low side 236 to the high side 238 of a DC bus. Inductors 240 may be coupled to both the high and low sides of the DC bus and act as chokes for smoothing the rectified DC voltage waveform. One or more filter capacitors 242 may link the high side 238 and low side 236 of the DC bus and are also configured to smooth the rectified DC voltage waveform. Together, the inductors and capacitors serve to remove most of the ripple from the waveform, so that the DC bus carries a waveform closely approximating a true DC voltage. It should be noted that the three-phase implementation described herein is not intended to be limiting, and the invention may be employed on single-phase circuitry, as well as on circuitry designed for applications other than motor drives.

An inverter 244 is coupled to the DC bus and generates a three phase output waveform at a desired frequency for driving a motor 216 connected to the output terminals 218, 220, and 222. In the illustrated embodiment, within the inverter 244, for each phase, two insulated gate bipolar transistors (IGBT's) 246 are coupled in series, collector to emitter, between the high side 238 and low side 236 of the DC bus. Three of these transistor pairs are then coupled in parallel to the DC bus, for a total of six transistors 246. Each of the output terminals 218, 220, and 222 is coupled to one of the outputs between one of the pairs of transistors 246. The driver circuitry 204 signals the transistors 246 to rapidly close and open, resulting in a three phase waveform output across output terminals 218, 220, and 222. The driver circuitry 204 is controlled by the control circuitry 202.

Figure 4:
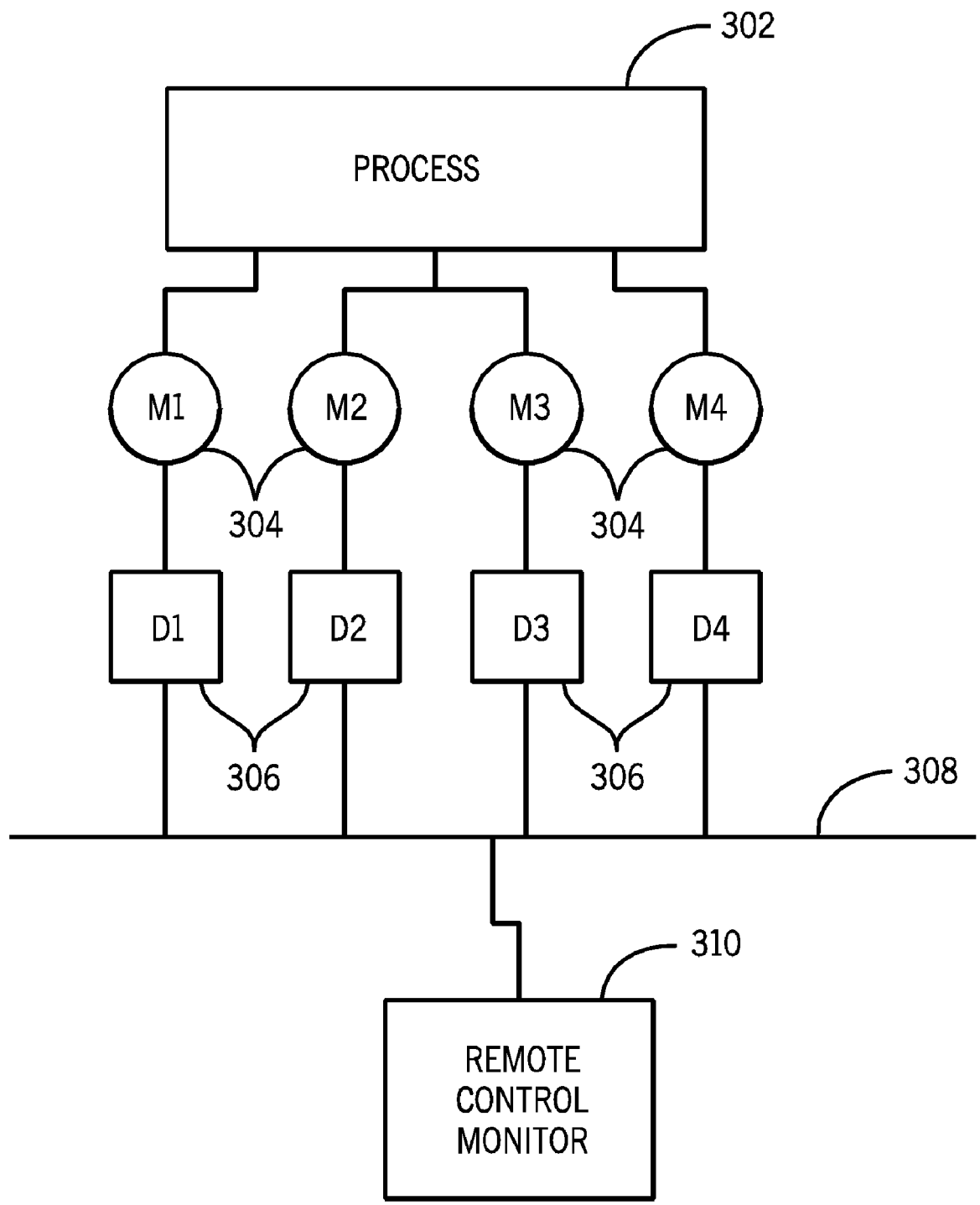
FIG. 4 is a block diagram of multiple motors and drives controlling a process in accordance with an embodiment of the present invention.

In some embodiments, multiple motor drives and motors may be used to control a process. For example, as illustrated in FIG. 4, a process 302 may be controlled by multiple motors 304 such as a first motor M1, a second motor M2, a third motor M3, and a fourth motor M4. Each motor 304 may be controlled by a respective motor drive 306. For example, the motor M1 may be controlled by motor drive D1, the motor M2 may be controlled by motor drive D2, the motor M3 may be controlled by motor drive D3, and the motor M4 may be controlled by the motor drive D4. The motor drives 306 may be connected together via a network 308, such as a network employing a known standard communications protocol, such as industrial DeviceNet, ControlNet, or Ethernet. A remote control and monitoring station 310 may be connected to the motor drives by the network 308 to provide for control and monitoring of the drives 306, the motors 304 and the process 302.

As discussed above, in some embodiments a motor drive may add functionality, connections, or both through the addition of option boards installed in the motor drive. The option boards may be in communication with other motor drives, motors, sensors, or other devices. As discussed above with respect to FIG. 4, for example, multiple drives and motors may be used to control a process. In accordance with an embodiment of the present invention, a motor drive may provide one or more serial interfaces for the addition of option boards. Additionally, to facilitate control of highly synchronized drives and motors, the dedicated serial interface may provide synchronization between each of the option boards and the control board or circuitry of the respective motor drive through the use of synchronized interrupts. Additionally, the communication and synchronization between the option boards and the control board may be selected and configured by user, such that different communication speeds may be enabled while maintaining the synchronization. Further, some embodiments may include profiles to select and configure the communication and synchronization of the option boards.

Figure 5:
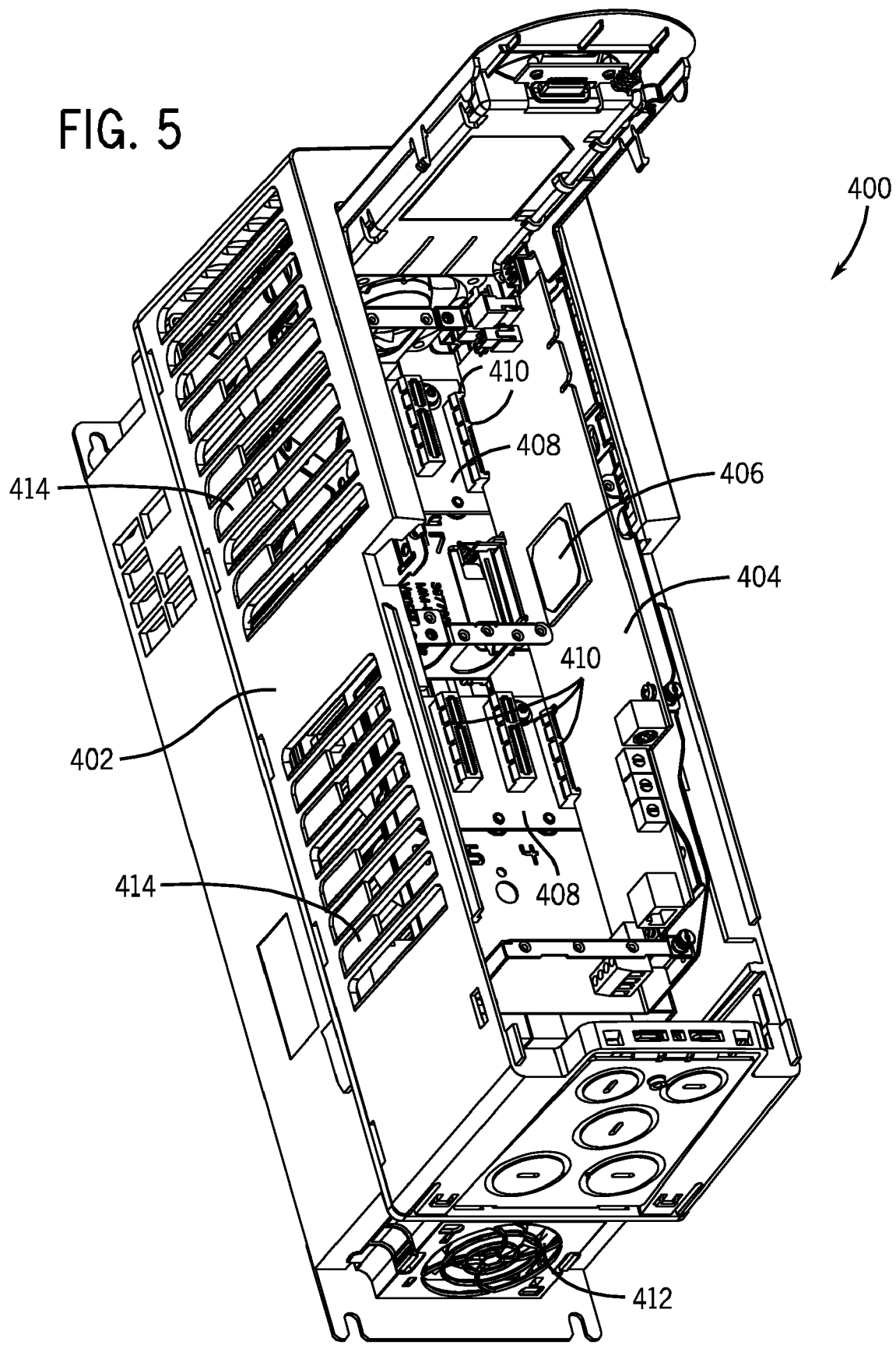
FIG. 5 is a perspective view of a pod and backplane in accordance with an embodiment of the present invention.

To facilitate addition of the option cards, a motor drive may include a "pod" 400 having a chassis 402 as shown in FIG. 5. The pod 400 may be mounted inside a motor drive, and acts as a modular card rack for the option boards discussed below. The pod 400 may include a control board 404, which may manage and process signals received from the option boards, as discussed further below. The control board 404 may include one or more processors 406, (which may include microprocessors, CPU's, field programmable gate arrays, etc.) to provide applications, management and processing. The processor 406 may include or be associated with a memory having applications for operating the control board 404, the option boards in the pod 400, or any other device in the motor drive. For example, the processor 406 may include applications such as an interface, torque control, vector control, drive logic, Ethernet logic, etc. The control board 404 may also include a field programmable gate array for communication and simple processing tasks. For example, in an embodiment the field programmable gate array may perform transfer, size, and CRC frame adders and receive frame stripping, CRC verification, error handling and communication status without processor intervention. Additionally, the control board 404 may include additional interfaces for connection to other motor drives or devices in accordance with certain data exchange standards, such as IEEE 1588, Ethernet, etc.

The pod chassis 402 may include a one or more backplanes 408, which generally support and provide the physical interconnect between the control board 404 and various option boards. The backplanes 408 may include a printed circuit board having any number of slots, plugs, connectors, or other interface structures. The backplane 408 provides for distribution of power and data signals, and enables the option cards to be interfaced with a network. For example, as shown in FIG. 5, the backplane 408 includes a plurality of slots 410, configured to receive various option boards as described further below. In one embodiment, the pod 400 may include two backplanes 408 having six slots 410 each.

The pod chassis 402 may also include additional features to increase reliability and performance. The chassis 402 may include one or more fans 412 and one or vents 414 on any portion of the chassis 402 to allow for airflow and heat dissipation.

Figure 6:
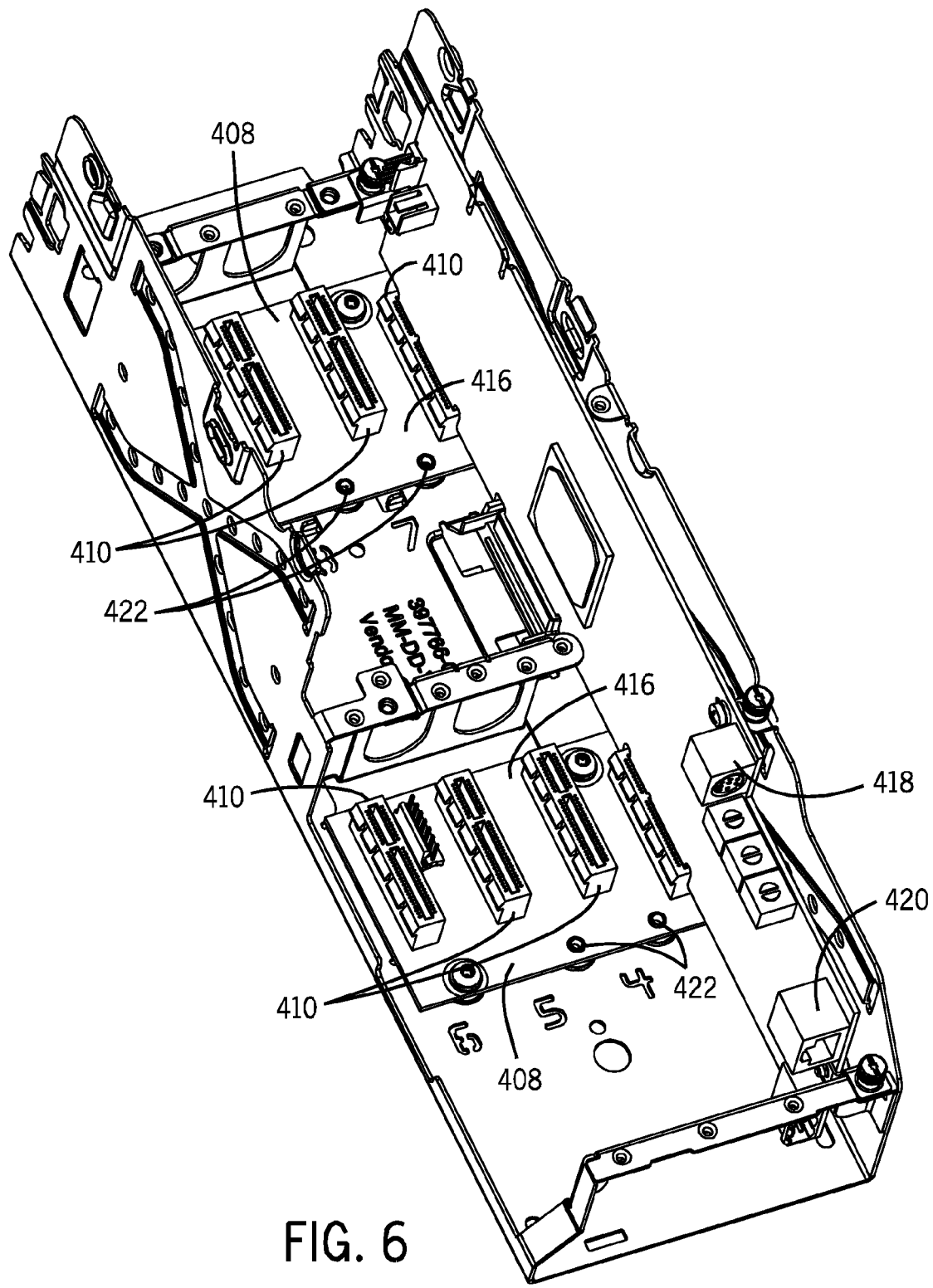
FIG. 6 is a cutaway perspective view of the pod and backplane of FIG. 5 in accordance with an embodiment of the present invention.

FIG. 6 is a cutaway view of the pod 400 illustrating the pod 400 and backplanes 408 in further detail. The backplanes 408 may include a bus board 416 providing the interface slots 410 and the necessary bus routing to the control board 404. The backplane 408 may also include one or more communication ports, such as a multi-pin communication port 418 and an Ethernet port 420. In one embodiment, the backplanes 408 may have six interface slots and may receive up to six option boards. The backplanes 408 may include one or more receptacles 422 configured to receive one or more screws or other fastener to secure an option board, as discussed below. Of course, any number of such option board slots may be provided, depending upon the range of options contemplated for the system.

FIGS. 7-10 illustrate various option boards configured to mate with the interface slots 410. It should be appreciated that some embodiments may include options board not illustrated below that include any number of processors, memory, interfaces, inputs and/or outputs. The options boards may provide any desired functionality, including: input and output; signal conditioning; isolation; data conversion; safety; analog-to-digital (A/D) conversion or other data conversion; and communication via standard protocols such as DeviceNet, ControlNet, and/or Ethernet. As explained further below, various option boards may also include one or more of the following components: processor, FPGA, memory, logic registers, clock, terminals, input/output ports, etc. In the presently contemplated embodiment, special option boards may be developed from time to time to address particular system and application needs, to perform particular types of data processing, interfacing with legacy systems, and so forth.

For example, beginning with FIG. 7, a first option board 500 may include a processor 502 and an FPGA 503. To engage an interface slot 410, the option board 500 may include a bus interface 504. As mentioned above, in one embodiment the bus interface 504 may be a PCI-E style connector. Additionally, the option board 500 may have one or more connectors 506 or terminals 508 for connection to various inputs and outputs used by the option board 500. To secure the option board 500 to the pod 400, and the receptacles 418, the option board 500 may include one or more screws 510, such as thumbscrews. In some embodiments, other mechanisms may be used to secure the option board 500, such as clips or other fasteners.

Figure 9:
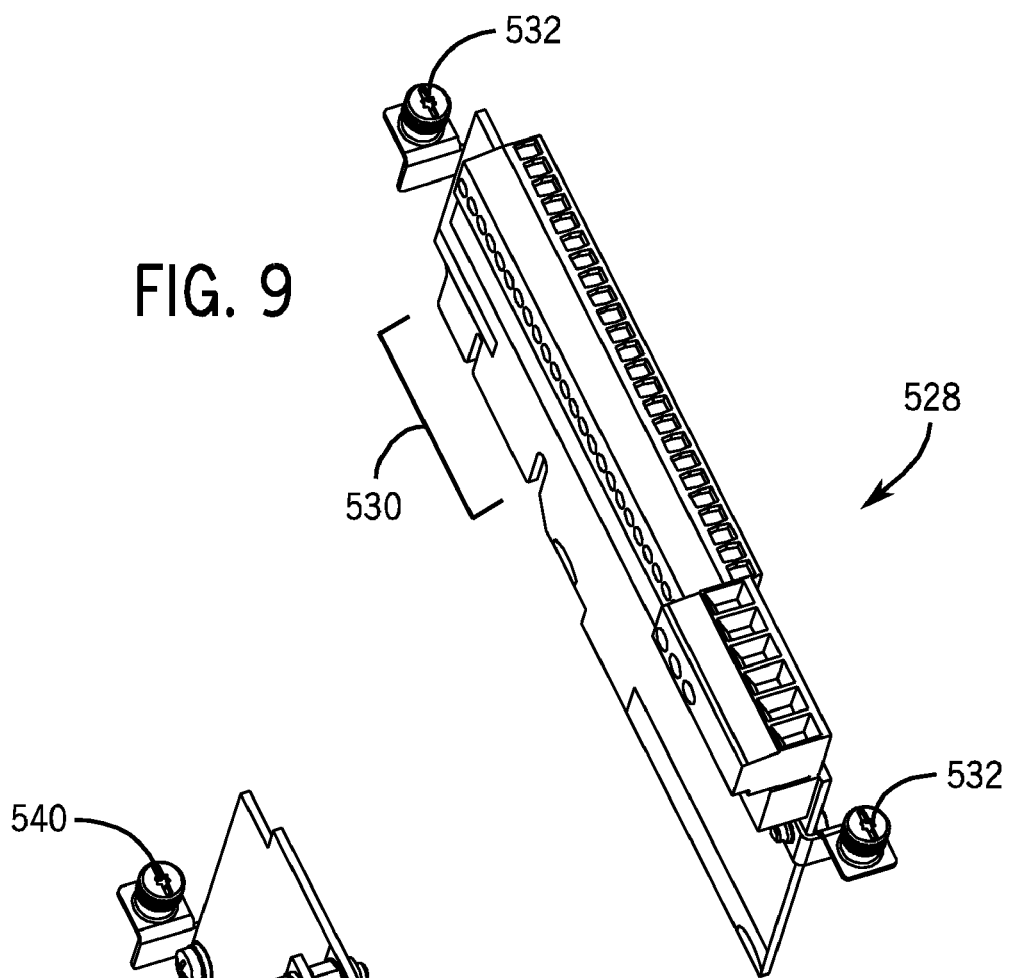

FIG. 8 depicts another option board 514 also having a bus interface 516 for insertion into the interface slots 410. The option board 514 includes capacitors 518, and a processor or FPGA 520. Additionally, the option board 514 includes input-output terminals 522, and may include one or more screws 524. FIG. 9 depicts another option board 528 having a bus interface 530 and one or more screws 532 having functions as described above.

Figure 10:
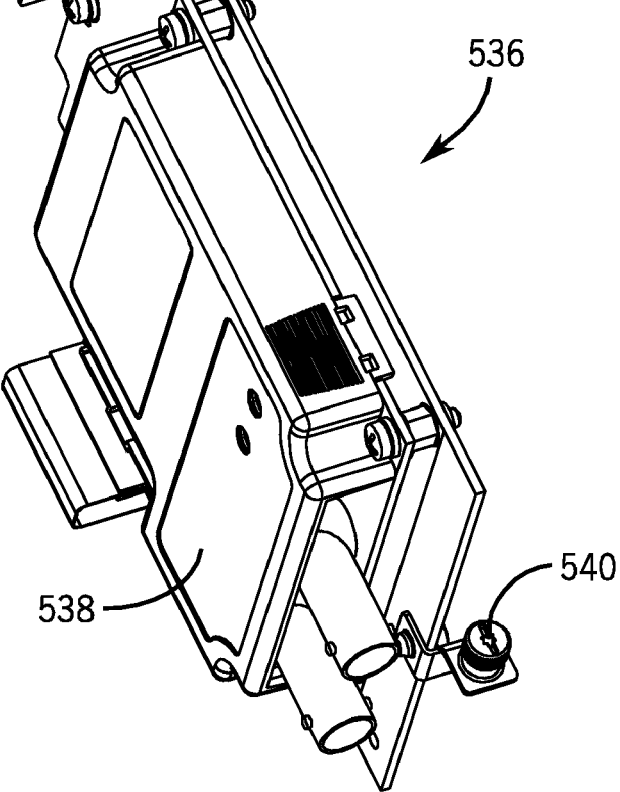

Finally, FIG. 10 illustrates an option board 536 configured to allow use of a "legacy" option board. For example, the option board 536 includes a legacy board 538 mounted to the option board 536, such as by one or more screws 540. In such an embodiment, the legacy board may connect to the option board 536 via any interface suitable for communication with both the option board 536 and the legacy board 538. The option board 536 may provide any emulation, translation, or other processing necessary for communication with the legacy board 538. The option board 536 may also include a bus interface (not shown) for communication with the interface slots 410 and may also include one or more screws 540 to secure the option board 536 to the pod 400. Communication from the legacy board 538 may be routed through the option board 526 and the bus interface for communication to the control board. Advantageously, the control board backplanes 408 and option boards described above allow connection of option boards without wiring or other internal cable connections.

Figure 11:
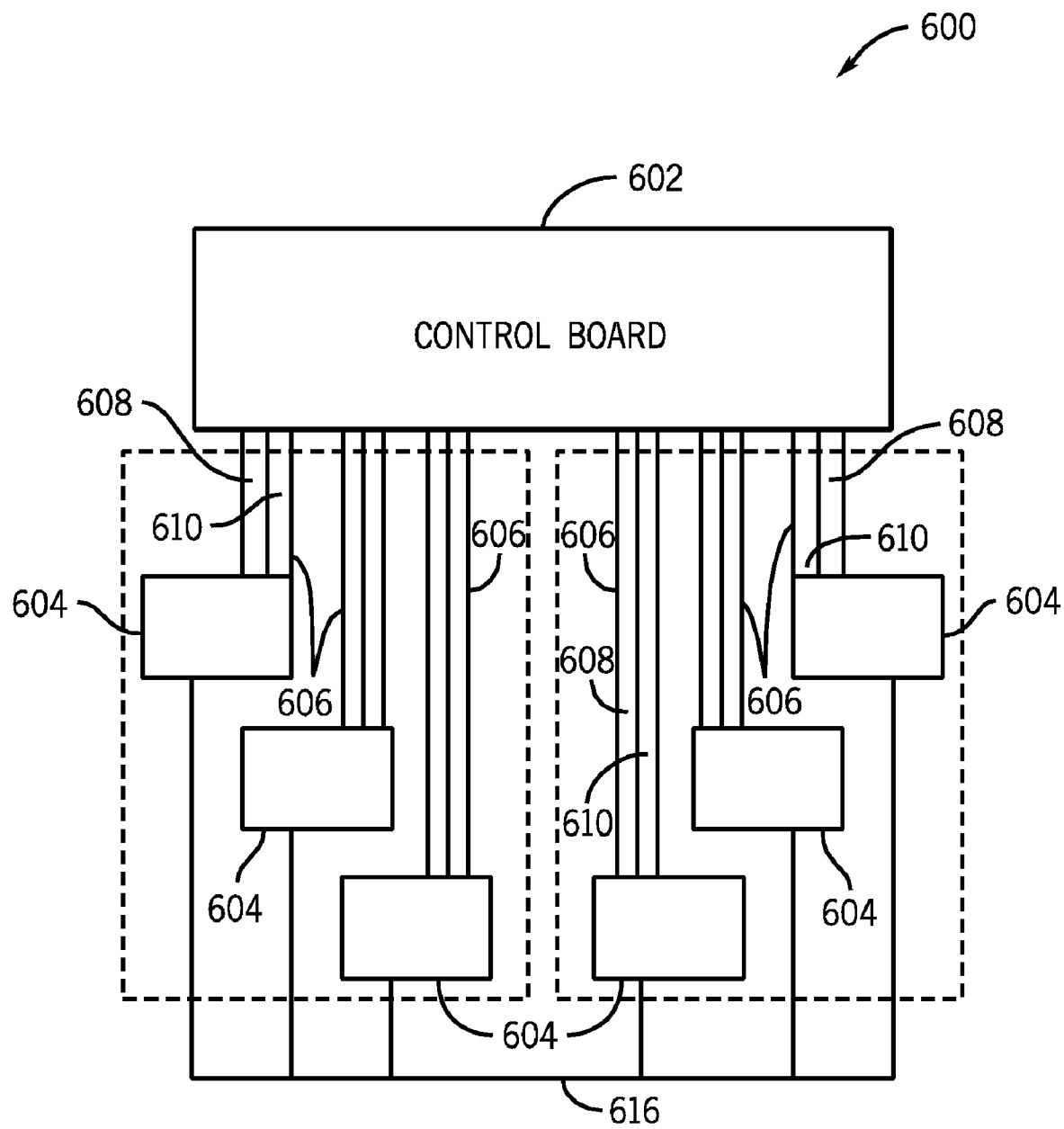
FIG. 11 is a block diagram illustrating connections between a control board and various option boards in accordance with an embodiment of the present invention.

FIG. 11 is a block diagram 600 illustrating the connections between a control board 602 and a plurality of option boards 604. The option boards 604 may be connected to the control board by dedicated dual channel full duplex serial interfaces 606. As discussed above, each option board 604 may include a clock that controls the timing of signaling on the respective serial interface 606. In some embodiments, the control board 602 and option boards 604 may also include a CAN (DPI) channel. As described further below, each channel may carry different signals, such coordinated by an interrupt scheme based on a "Control Event" on a first channel 608 and a "System Event" on a second channel 610, and the timing of the signals may be controlled by the clock on the option boards 604. By using the dedicated serial interfaces 606, the control board 602 allows transfer for serial communication of information from the option boards simultaneously and in parallel. Additionally, as dictated by the timing of the "Control Event," the data transfer from each option board 604 may be synchronized.

As described above, in some embodiments the pod 400 may have two (or more) backplanes, as indicated by a dashed regions 612 and 614. In the illustrated embodiment, because each backplane 612 and 614 may include three interface slots, which in one embodiment may be PCI-E style connector slots, three dedicated serial buses are provided on each backplane. In addition to communication with the control board 602, the option boards 604 may communicate with each other via a network 616. By using the network 616, the option boards 604 may communicate with each other without first routing the communication through the control board 602. In other embodiments, the option boards 604 may route communication to other options boards on the same backplane or an adjacent backplane via the control board 602.

Figure 12:
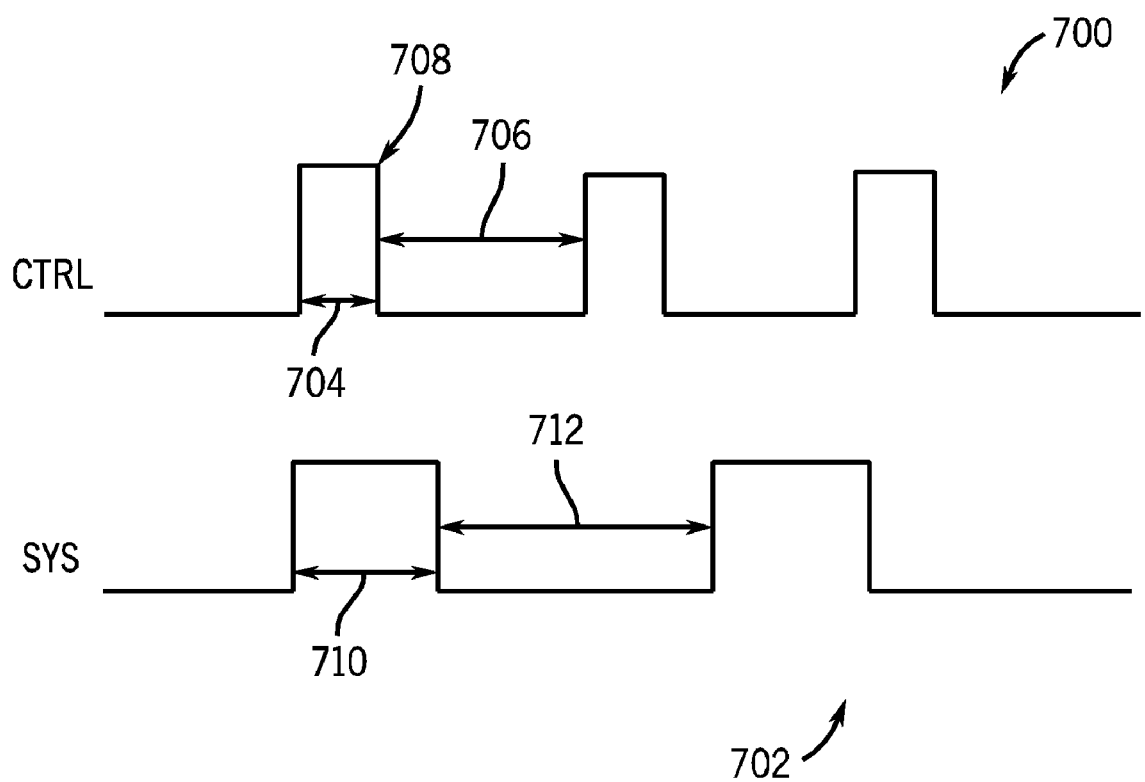
FIG. 12 depicts an interrupt scheme utilizing a "Control Event" signal and "System Event" signal for synchronized operation of a control board and option boards in accordance with an embodiment of the present invention.

As described above, in a presently contemplated embodiment, each channel of the dual channel full duplex serial interfaces 606 may transmit a specific signal. In this embodiment, the signal processing may be implemented by means of an FPGA on the control board 602. In other embodiments the signal processing may be implemented in software and may use a processor on the control board 602. FIG. 12 depicts the signals defining the interrupt scheme in further detail, such as a "Control Event" (CTRL) signal 700 and a "System Event" (SYS) signal 702. In one embodiment, the Control Event signal 700 may be used to coordinate the transfer and collection of data at very short intervals, such as data needed for commutation or generation of the output waveform, while the System Event signal 702 may be used to coordinate transfer and collection of less time-critical data, such as multiple types of system level messages, such as general feedback, communications, I/O, and so forth.

To ensure synchronization, regardless of the clock timing of each option board, each signal 700 and 702 may have a data acquisition interval and a transfer interval. For example, the Control Event signal may include a data acquisition window 704 and a transfer interval 706. In one embodiment, the data acquisition window 704 for the Control Event signal may about 6 μs, and the transfer interval may be about 128 μs to about 256 μs. At the end of the data acquisition window, a processor on the control board is interrupted, e.g., via an IRQ, to ensure no wasted idle or wait time is consumed by the CPU. By providing a data acquisition window 704, the control board is ensured of receiving all data from the option boards in the pod. Thus, in a presently contemplated embodiment, the rising edge 708 of the Control Event signal, the option boards may shift their register to the control board within the 6 μs window. The clock rate of the option boards may be set at the appropriate level to ensure this data is transferred in the data acquisition window. The clock rate may be standardized at 32 MHz, although other rates may be employed. Advantageously, this ensures that all registers (signals) from the options boards will be synchronized. That is, no matter when each option board acquired its data, all options board must report to the control board by the end of the data acquisition window. In one embodiment, the Control Event signal may be referred to as a "Control Event Primary" signal and may be used for control task (commutation) data acquisition from the option cards, such as for such data as torque references, encoder feedback, etc. Further, to facilitate communication with the serial interface, the option boards may include a shift register interface having a 32-bit length, and the transfer rate may controlled by a clock on the option board.

Similarly, in a presently contemplated embodiment, the System Event signal 702 may include a data acquisition interval 710 and a transfer interval 712. In such an embodiment, the data acquisition window 710 for the System Event signal 702 may be about 20 μs and the transfer interval may be about 1-2 ms to about 256 μs. In some embodiments, the System Event signal 702 may provide for both a primary and secondary message sent on the data acquisition interval and transfer interval respectively. In such an embodiment, the secondary message must be completed prior to the end of transfer interval. In one embodiment, the primary message may be referred to as a "System Event Primary" and have a 64 byte storage limit, and the secondary message may be referred to as "Secondary Event Continuous" and have a 512 byte storage limit.

It should be noted that the particular speed, data acquisition interval length, interrupt spacing, and so forth used in the drive may be different from that set forth in the present discussion. For example, the timing of the deterministic interrupt scheme is set based upon such factors as the amount of data to be transferred from the option boards (or from the control circuit to the option boards), and the duration of the data acquisition interval desired, as compared to the duration of the processing window needed. That is, the processing circuitry of the control board will collect and process the data received, and perform the control functions for operation of the motor coupled to the drive, and will need some time to perform such functions. The data acquisition window may be set to a duration that is a function of the anticipated processing time, such as 10%. Such considerations may result in design choices within the ambit of those skilled in the art.

It will be appreciated that the use of dedicated serial interfaces for each functional circuit (option board), and the interrupt scheme for transfer and collection of data from all such circuits provides a deterministic, synchronous interrupt structure that permits very fast data transfer rates. The serial interfaces essentially function as bit shift registers for the transfer of data without the need for traffic control between the circuits. Similarly, it should be noted that while the rate of transfer of data from the functional circuits may be set, such as at 32 MHz, this rate is actually configurable. Thus, where less data is to be delivered in the available time, a slower data transfer rate from the functional circuit may be set (e.g., as low as 2 MHz), while for more demanding data transfer, even higher rates may be set (e.g., 64 MHz). Moreover, the rates of data transfer from the different option boards, even within a single drive, need not be the same. Different rates may be set for different option boards, while still maintaining synchronization in operation by virtue of the dedicated serial interfaces and deterministic interrupt scheme. Similarly, different data transfer rates may be used for different channels for each board, and these rates may be changed over time. In certain applications the use of different data transfer rates may aid in reducing harmonic distortion or interference between the interfaces and channels.

The System Event Primary may be used for a "login" function on the serial interface such that each option card may use this signal to log on to the control board and establish communication. The System Event Primary may be used for system task data acquisition, such as analog I/O, digital I/O, feedback, communications, etc. Additionally, in one embodiment the System Event Continuous signal may provide additional communication such as transfer of large data blocks.

Figure 13:
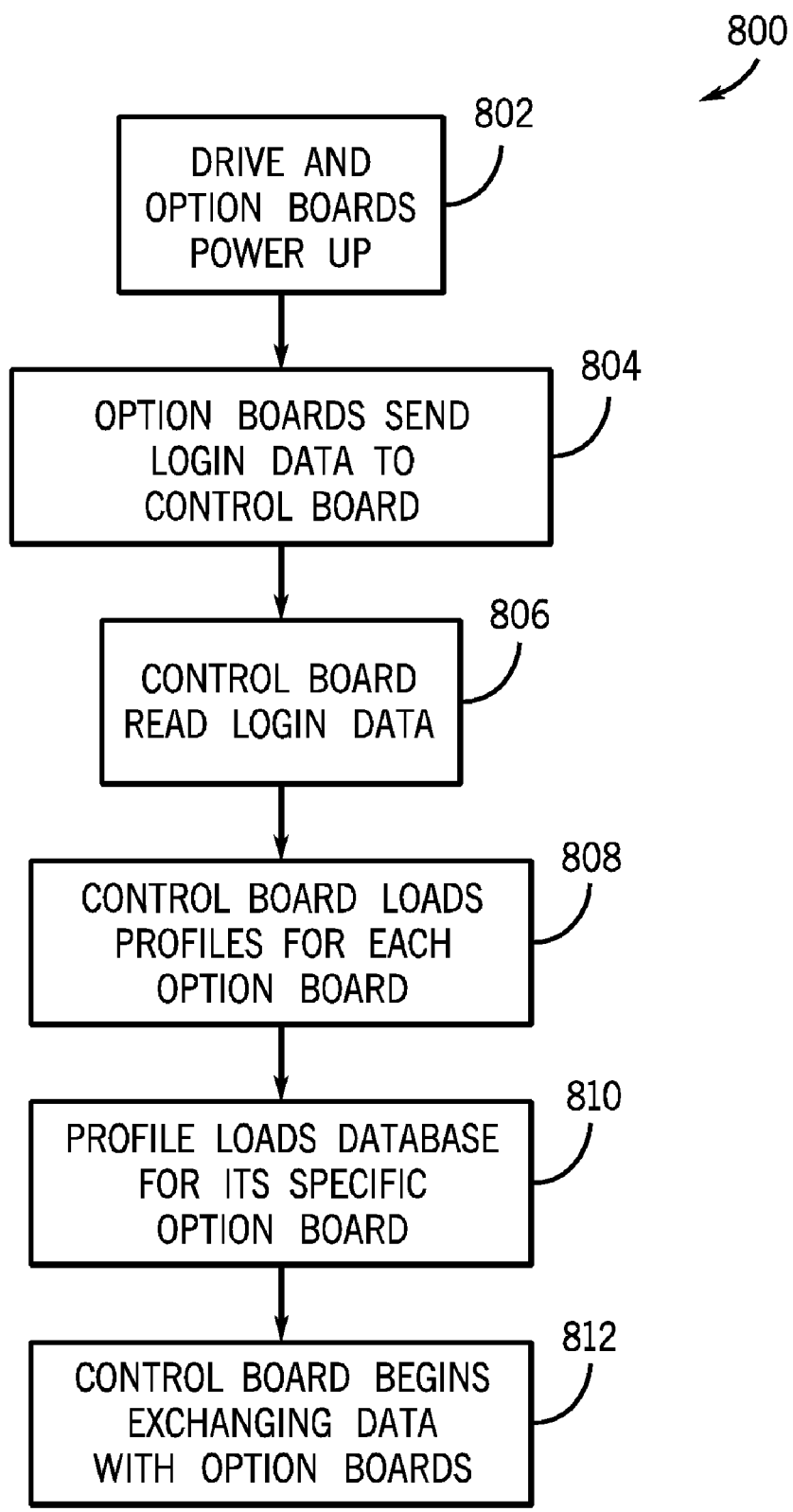
FIG. 13 depicts a process for operation of a control board and option board using a profile in accordance with an embodiment of the present invention.

To facilitate communication and interfacing of a control board with the option boards, the control board and/or option boards may use profiles to assist with the "log on" of the option boards. FIG. 13 depicts a process 800 for operation of a control board and option board using a profile in accordance with an embodiment of the present invention. Initially, upon startup of a motor drive having a backplane with a control board as described above, an installed option board is also powered on (block 802). The option board sends data to the control board during the data acquisition window of the "System Event" signal (block 804), as described above. In response, the control board references a locally stored database (block 806) that may store profiles for the various option boards. The control board reads "log on" info received in the data from the option board (block 808) that may provide identification information and the state for of option board. The control board then loads the appropriate profile for the option board from the database (block 810) and begins communication with the option board (block 812).

In one embodiment, the HMI on a motor drive may provide a user interface for accessing, managing, and configuring the option boards installed in a pod of the motor drive. As mentioned above, the user interface may be provided on a processor and a memory of the control board. In many applications, however, the initial configuration of the drive will be performed by coupling the drive to a workstation, which may include a conventional programmed computer (e.g., personal computer). Screen views provided by software on the workstation, or served by the drive to the workstation facilitate in selecting parameter settings, units of measure, parameter names, and so forth. The profile for each option board, moreover, greatly facilitates this process, and each profile may already preconfigure certain of the settings for the option board, or may reduce the set of options presented to the installer or system integrator to those available or appropriate to that option board and selected system setup. The profiles may thus be part of an automatic device configuration scheme, streamlining setup of the drives by reducing the information presented to the installer and guiding the installer though the setup. It is presently contemplated that such individual profiles may be stored on the option boards (i.e., each option board including its respective profile), and fed to the control board, or a library of profiles may be stored on the control board, and an appropriate profile used for configuration of a specific option board if it is recognized as present in the drive by the control board. Such profiles may also be downloaded to the drive from a library, such as via the network connection provided to the drive, or upon initial installation. Certain of these options may allow for expansion of the number and types of functional circuits available over time.

It should be noted that in another presently contemplated implementation, the profile data (defining functions of the functional circuits, parameters they provide or need for operation, rates of transfer of data, etc.) may be provided (e.g., uploaded) directly from the functional circuits to the control circuit without reference to a database or library or profiles. This approach essentially relies on storage of the profile data in the functional circuitry and loading or transfer of the data to the control circuit. However, this approach may prove more generic insomuch as additional functional circuits may be developed over time, and these may "self-configure" the control circuitry which would need no prior information or data relating to the profile or to the functional circuit.

Figure 14:
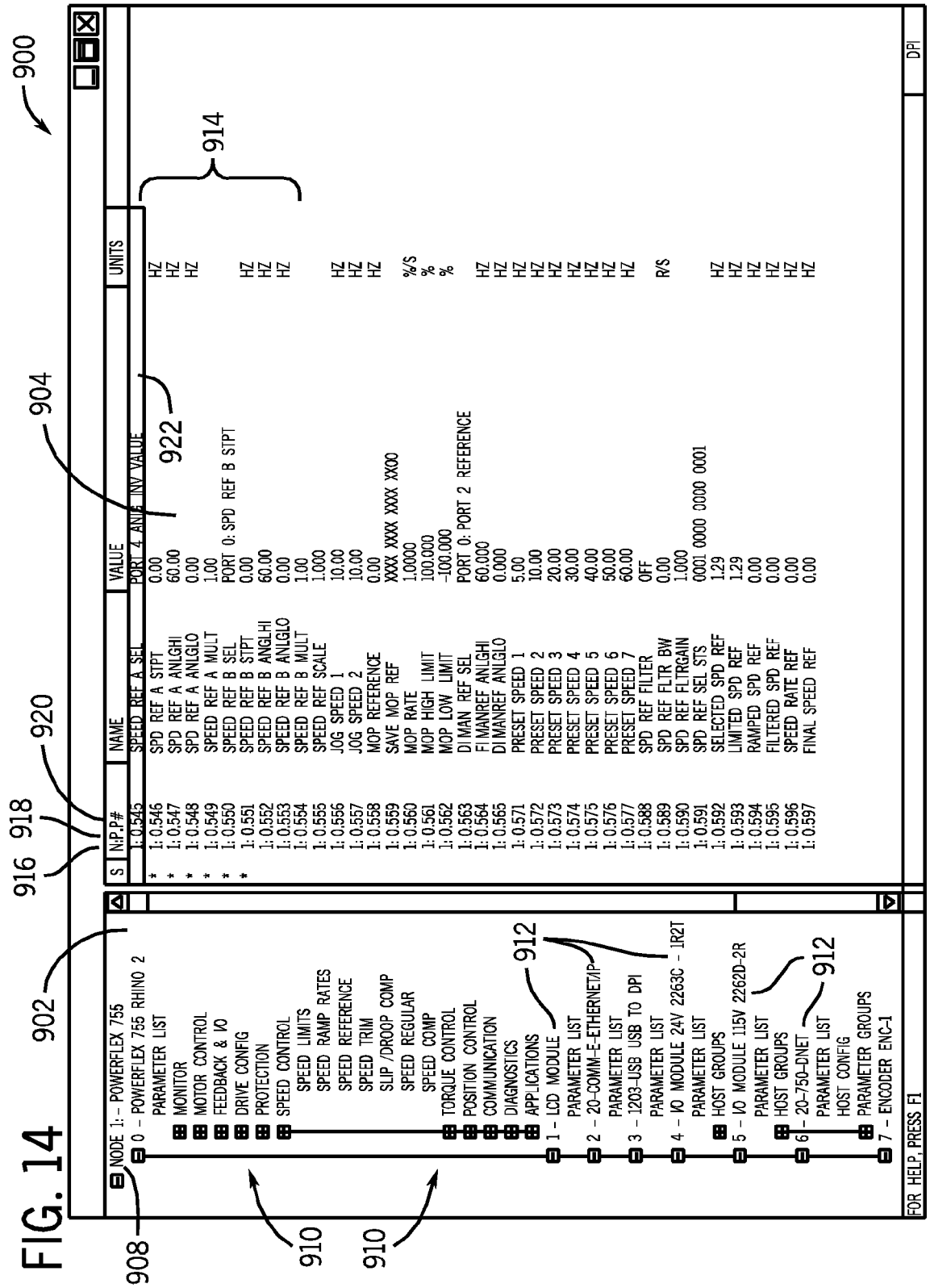
FIGS. 14 and 15 depict screenshots a user interface for configuring a control board and option board in accordance with an embodiment of the present invention.
Figure 15:
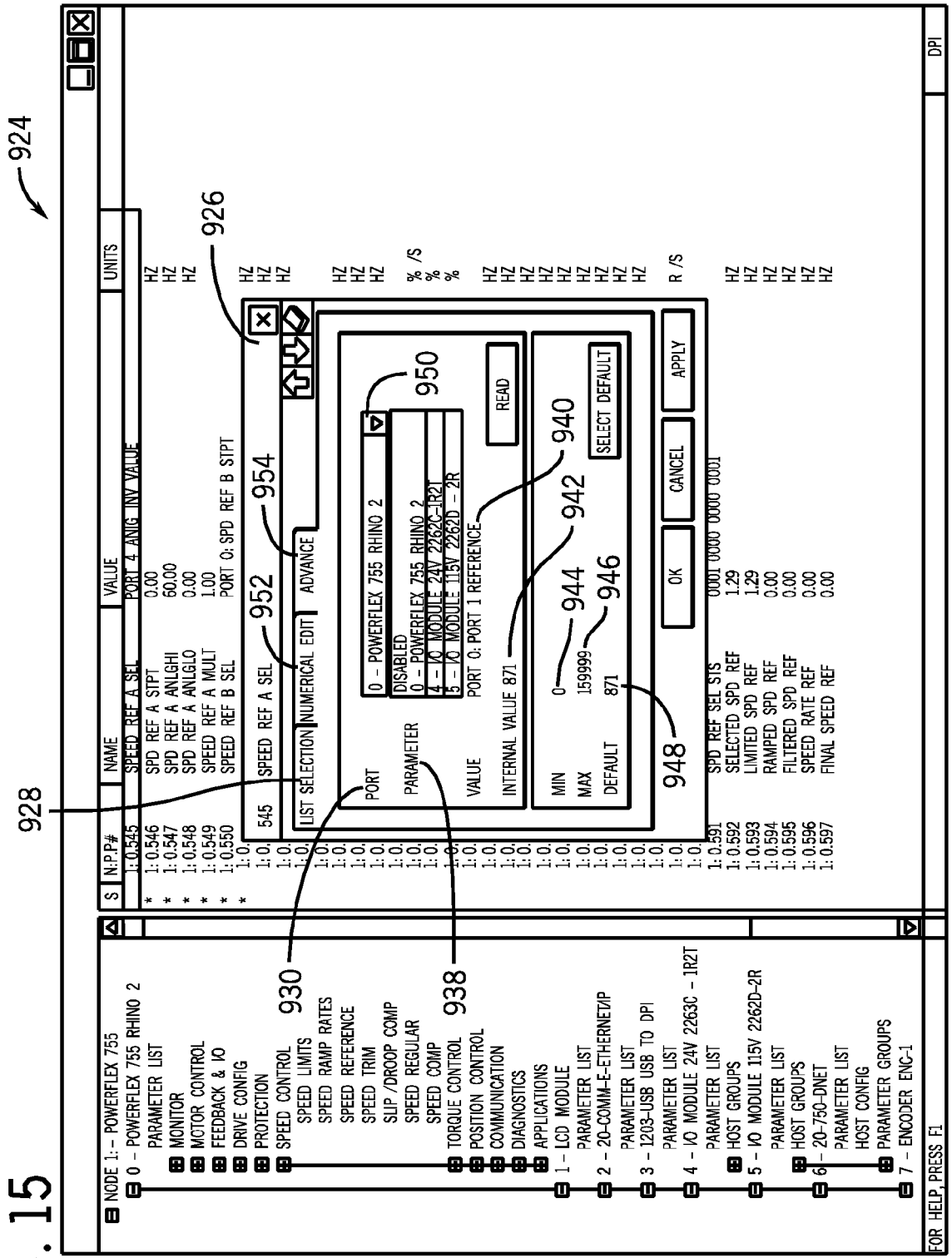

FIGS. 14 and 15 depict screenshots of such a user interface in accordance with an embodiment of the present invention. FIG. 13 depicts a first screen 900 having a left hand navigation pane 902 and a right hand parameter pane 904. As illustrated in FIG. 14, the navigation pane 902 includes list of the control boards and associated option boards for a motor drive. The control boards may be listed as nodes in the navigation pane and may include any number of collapsible parameters and device underneath. For example, a first node 908 (Node 1) corresponds to the "PowerFlex 755" control board. Underneath the first node 908 various parameters 910 are listed. The option boards 912 may also be listed underneath the first node 908. In one embodiment, the option boards 912 may be arranged according to the interface slots occupied by the option board. For example, a first option board 914 (LCD Module) may be listed in slot 1, a second option board 916 (20-COMM-E-Ethernet/IP) may be listed in slot 2, etc.

By selecting a node 908, e.g., a control board 908, or an option board 912, a user may display the parameters associated with that control board or option board. For example, the right hand pane 904 a list of parameters is displayed, such as the speed parameters 914. The right hand pane 904 may display information about each item listed, including a node column 916, a slot column 918, and a parameter number 920, with each column displaying the node, slot and parameter respectively of each item. To configure a node, a user may select a parameter, as illustrated by the selected parameter 922 (Speed Ref A Set, e.g., a speed reference).

As shown in FIG. 15, the second screen 924 illustrates a pop-up window 926 that displays after selection of a parameter. The pop-up window 926 corresponds to the selected parameter 922 and provides a number of selections. As shown, a first tab 928 (List Selection) displays the port 930, the parameter 938, the value 940 and the internal value 942. Additionally, a minimum value 944, a maximum value 946, and a default value 948 may also be set. The port 930 may display a drop down box corresponding to the port or slot selectable by the user. To configure the parameter 922 for a specific port, a user may select the port from the drop down menu 950, such as selecting port (node) 0, port 4, port 5, etc. After the port 930 is selected, the parameter 938 may be configured by entering a new value. Additional tabs in the pop-window 926 may include additional functionality, such as a "Numeric Edit" tab 952 and an "Advanced tab" 954. The "Numeric Edit" tab 952 may allow direct editing of numeric parameters, and the "Advanced tab" 954 may include additional configuration operations for the selected parameter 922. In this manner, a user may configure of any option boards coupled to the backplane of a motor drive. It should be noted that any number of drives may be configured in a similar manner, particularly where numerous drives are networked together in a system. Thus, the system integrator may navigate to a specific drive for its configuration, then to other drives for configuration of the overall system.

The interrupt scheme described above permits synchronization of all functions within the motor drive, including the acquisition of data from all functional circuits supported on the option boards. That is, because all data is received serially from all of the option board functional circuits and in response to the Command and System interrupts, all of the data is assured of being received by the control circuitry at the same time. Once received, the data can be acted upon by the processing capabilities of the control circuitry in the interim between interrupts. For data that directly affects motor control, sometimes referred to as communication data, the data acquisition is particularly fast, with little time between the interrupts. For other data, the intervals may be more widely spaced in time.

Figure 16:
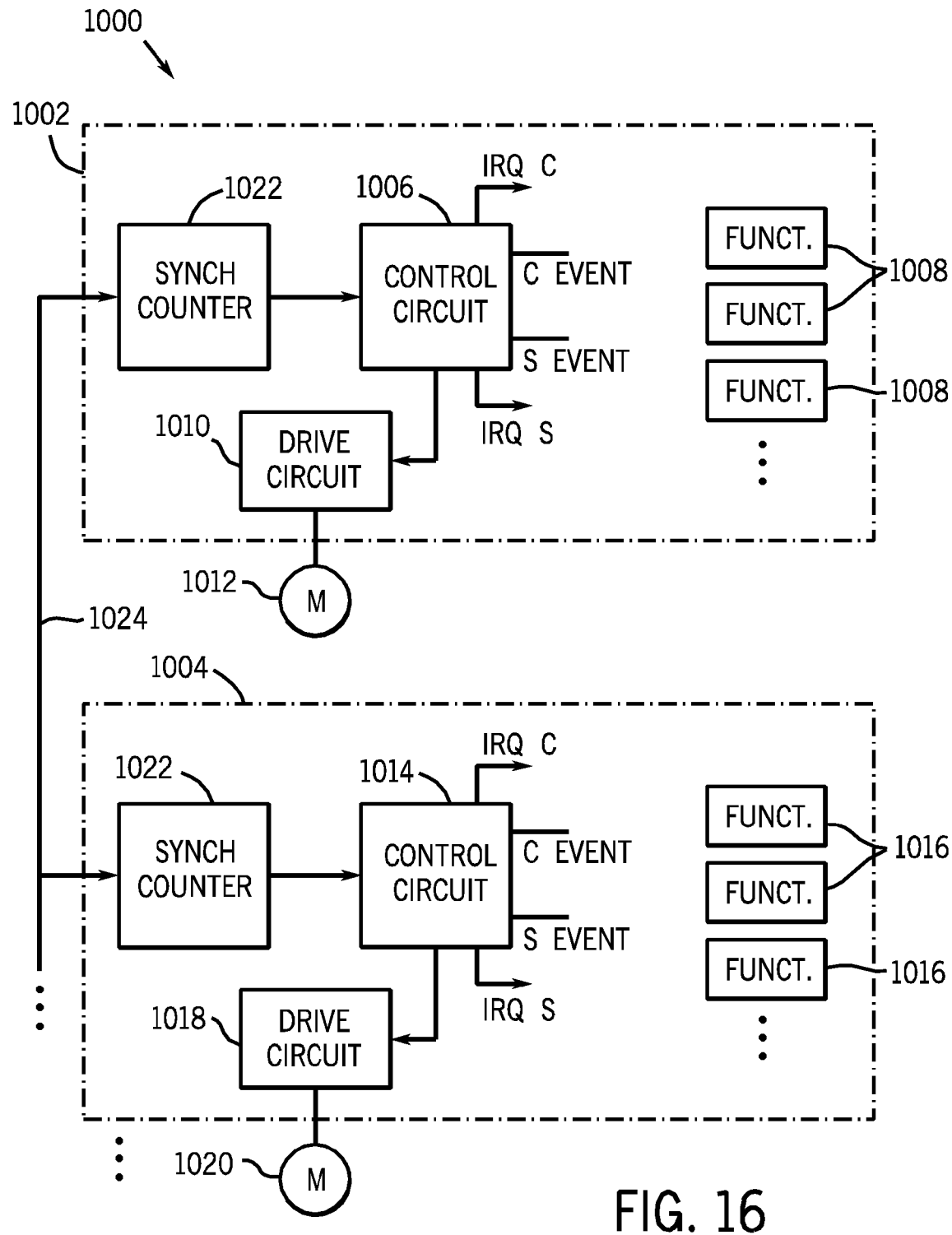
FIG. 16 is a diagrammatical representation of a pair of motor drives, illustrating how multiple drives may be synchronized down to a functional circuit level.

The same interrupt scheme, and close synchronization of data acquisition can also allow for very accurate synchronization between drives linked to one another via a network. For example, FIG. 16 illustrates a system 1000 in which two motor drives 1002 and 1004 are interconnected to maintain synchronization. Drive 1002 includes a control circuit 1006 of the type described above, coupled to functional circuits 1008. As in the embodiments described above, the control circuit will typically be supported separately from the functional circuits, such as on a control board, while the functional circuits are supported on option boards. The number and type of such option boards may vary depending upon the system requirements, the type of control to be performed, and so forth. Also as described above, the control circuit communicates with the functional circuits via dedicated serial interfaces, and coordinates the transfer and collection of data from the functional circuits by interrupts, thus maintaining precise synchronization of all drive operations down to the option board level. The control circuit utilizes data collected from the functional circuits to provide control signals to drive circuit 1010, which powers solid state switches to produce output power for a motor 1012, as described above.

Drive 1004 is similarly configured. It includes a control circuit 1014 and a series of functional circuits 1016 that communicate with the control circuit 1014 via dedicated serial interfaces, with data transfer again being coordinated via interrupts as described above. The control circuit 1018 similarly produces control signals that are applied to drive circuit 1018 for driving motor 1020.

In system 1000, the operation of motors 1012 and 1020 is coordinated and synchronized, such as for "multi-axis" control. Such coordinated control is extremely useful in many applications, such as integrated machines in which motors handle product in continuous processes. Examples may include printing applications, paper making applications, product handling applications, and so forth, to mention only a few.

To permit such high degree of synchronization, a synchronization counter 1022, or similar device, is included in each drive, and synchronizes the clock of the control circuit for that drive with that of other drives interconnected in the system. In a presently contemplated embodiment, the drives are interconnected via a network connection 1024, which utilizes an Ethernet communications protocol, although other protocols may be used. The coordination of the synchronization counters is performed in accordance with IEEE 1588 standards.

It has been found that the use of such clock synchronization between drives, in conjunction with the use of dedicated serial interfaces for functional circuits, and the interrupt scheme for transfer and collection of data from the functional circuits permits an unprecedented degree of coordination and synchronization of the drives. That is, in the overall system, all functional circuits (e.g., input/output circuits, communications circuits, encoders, parameter estimation/calculation circuits, etc.) of all drives can be precisely coordinated insomuch as the interrupts for transfer and collection of data from all such circuits occurs at the same time, as coordinated by synchronization of the clocks of all drives. Such coordination allows the drives to be used in applications and with a degree of precision that was heretofore unavailable in similar production equipment.

It should also be noted that, as mentioned above, the use of dedicated serial data interfaces for the functional circuits, and the interrupt structure described above also permits sending and receiving synchronized messages between the control circuitry and the functional circuits. That is, during an interrupt, a rising edge is used to start a message transfer between the control and functional circuits. This may be referred to as the primary message transfer. In addition to this message transfer, however, a secondary message transfer may be implemented between the control and functional circuits. This may occur when the interrupt ends (returns to a low state, i.e., a falling edge is detected). In a presently contemplated implementation, this secondary transfer occurs after the initial 6 µs or 20 µs timing interval (or any other interrupt interval employed) until the next periodic interrupt. This secondary message transfer allows for further utilization of the serial transfer bandwidth.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A motor drive, comprising:
  a control circuit configured to control operation of a single electric motor; and
  a plurality of functional circuits supported separately from the control circuit and coupled to the control circuit via respective dedicated serial interfaces, wherein data from the functional circuits is communicated via a plurality of synchronous interrupts on the serial interfaces, wherein the synchronous interrupts have multiple different periodicities for coordinating transfer of data from the functional circuits to the control circuit.

2. The motor drive of claim 1, wherein the serial interfaces comprise dual channel full duplex serial interfaces.

3. The motor drive of claim 2, wherein a first channel of the serial interfaces comprises a first interrupt and a second channel of the serial interfaces comprises a second interrupt.

4. The motor drive of claim 2, wherein a first channel comprises a first signal and a second channel comprises a second signal.

5. The motor drive of claim 4, wherein the first signal comprises a data acquisition time of approximately 6 µs.

6. The motor drive of claim 4, wherein the second signal comprises a data acquisition time of approximately 20 µs.

7. The motor drive of claim 1, comprising a backplane, wherein each of the plurality of functional circuits is supported on a respective circuit board coupled to the backplane via a slot interface.

8. The motor drive of claim 1, wherein the control circuit comprises a processor, a field programmable gate array, a memory, or a combination thereof.

9. The motor drive of claim 1, wherein the plurality of functional circuits comprises a field programmable gate array, a processor, a memory, or a combination thereof.

10. The motor drive of claim 1, wherein the control board comprises an IEEE 1588 interface.

11. The motor drive of claim 1, comprising power electronic circuitry operational under the control of the control circuit.

12. A method of operating a motor drive, comprising:
  transmitting one or more signals from a plurality of functional circuits to a control circuit configured to control operation of a single electric motor via a plurality of synchronous interrupts, wherein each of the plurality of functional circuits is supported separate from the control circuit and is coupled to the control circuit via a dedicated serial interface, wherein the synchronous interrupts have multiple different periodicities for coordinating transfer of data from the functional circuits to the control circuit.

13. The method of claim 12, wherein the serial interfaces comprise dual channel full duplex serial interfaces.

14. The method of claim 12, comprising transferring a first signal on a first channel of the serial interface of each functional circuit.

15. The method of claim 14, comprising transferring a second signal on a second channel of the serial interface of each functional circuit.

16. The method of claim 13, comprising transferring a first signal via a first interrupt of the serial interface of each functional circuit.

17. The method of claim 13, comprising transferring a second signal via a second interrupt of the serial interface of each functional circuit.

18. The method of claim 13, comprising receiving data from a functional circuit during a data acquisition window of the first signal.

19. A non-transitory machine readable medium, comprising:
   code stored on the non-transitory machine-readable medium defining instructions for transmitting one or more signals from a plurality of functional circuits to a control circuit configured to control operation of a single electric motor via a plurality of synchronous interrupts, wherein each of the plurality of functional circuits is supported separate from the control circuit and is coupled to the control circuit via a dedicated serial interface, wherein the synchronous interrupts have multiple different periodicities for coordinating transfer of data from the functional circuits to the control circuit.

20. The medium of claim 19, wherein the code includes instructions for transmitting a first signal via a first interrupt of the serial interfaces and transmitting a second signal via a second interrupt of the serial interfaces.

21. A motor drive, comprising:
   a control circuit configured to control operation of a single electric motor; and
   a plurality of functional circuits supported separately from the control circuit and coupled to the control circuit via respective dedicated serial interfaces, wherein data from the functional circuits is communicated via a plurality of synchronous interrupts on the serial interfaces, wherein a first channel of each of the serial interfaces comprises a first interrupt and a second channel of each of the serial interfaces comprises a second interrupt, wherein the first interrupt for each serial interface has a different periodicity than the second interrupt for the serial interface.

22. The motor drive of claim 21, wherein the first interrupt for each serial interface has a periodicity more frequent than the second interrupt for the serial interface, and wherein the first interrupt for the serial interface prompts transfer of data required for commutation of power to a motor.

23. The motor drive of claim 21, wherein the first interrupts for each of the serial interfaces have a substantially similar periodicity, and the second interrupts for each of the serial interfaces have a substantially similar periodicity.

* * * * *